United States Patent [19]

Girod

[11] 4,065,643

[45] Dec. 27, 1977

[54] COMMUNICATION FACILITY INTEGRITY CHECKING ARRANGEMENT

[75] Inventor: Ronald Eugene Girod, Gahanna, Ohio

[73] Assignee: Bell Telephone Laboratories, Murray Hill, N.J.

[21] Appl. No.: 742,628

[22] Filed: Nov. 17, 1976

[51] Int. Cl.$^2$ .................................... H04M 7/06
[52] U.S. Cl. ........................... 179/18 AH; 179/27 D
[58] Field of Search ...................... 179/18 AH, 27 D

[56] References Cited

U.S. PATENT DOCUMENTS

| | | | |
|---|---|---|---|
| 1,751,263 | 3/1930 | Cesaro ................................ | 307/132 |
| 2,564,441 | 8/1951 | McKim et al. ..................... | 179/18 E |
| 2,868,884 | 5/1952 | Gooderham ........................ | 179/18 R |
| 3,239,690 | 3/1966 | Krom ................................. | 307/269 |
| 3,643,034 | 2/1972 | Burns et al. ....................... | 179/27 D |
| 3,809,823 | 5/1974 | Jacobs et al. ...................... | 179/27 D |
| 3,904,832 | 9/1975 | Fallon ................................ | 179/18 AH |

*Primary Examiner*—William C. Cooper
*Attorney, Agent, or Firm*—Frederick W. Padden

[57] ABSTRACT

Circuitry for integrity verification is provided to prevent a calling party from unknowingly remaining connected to a faulty trunk connection between an automatic switching office and an operator-assisted office. New circuit arrangements are added to the outgoing trunk circuit of the automatic office and to the line circuit of the operator-assisted office. At the outgoing trunk circuit, binary memory elements and associated circuitry are employed to delay the completion of the normally executed cross-office continuity check at the automatic office, thereby delaying release of common control equipment at that office. During the delay interval, interoffice integrity check signals are exchanged between the outgoing trunk circuit and the line circuit. Circuitry is added to the line circuit for the generation of a wink signal in response to a seizure signal from the outgoing trunk circuit. This wink signal is received at the trunk circuit as a timed off-hook signal followed by a steady on-hook signal. Only after interoffice integrity is thus verified does the outgoing trunk circuit allow for completion of the cross-office check and for the resultant release of common control equipment. If the interoffice integrity check is unsuccessful or unduly delayed, the caller is connected to a reorder trunk by normally-provided timeout circuitry.

21 Claims, 4 Drawing Figures

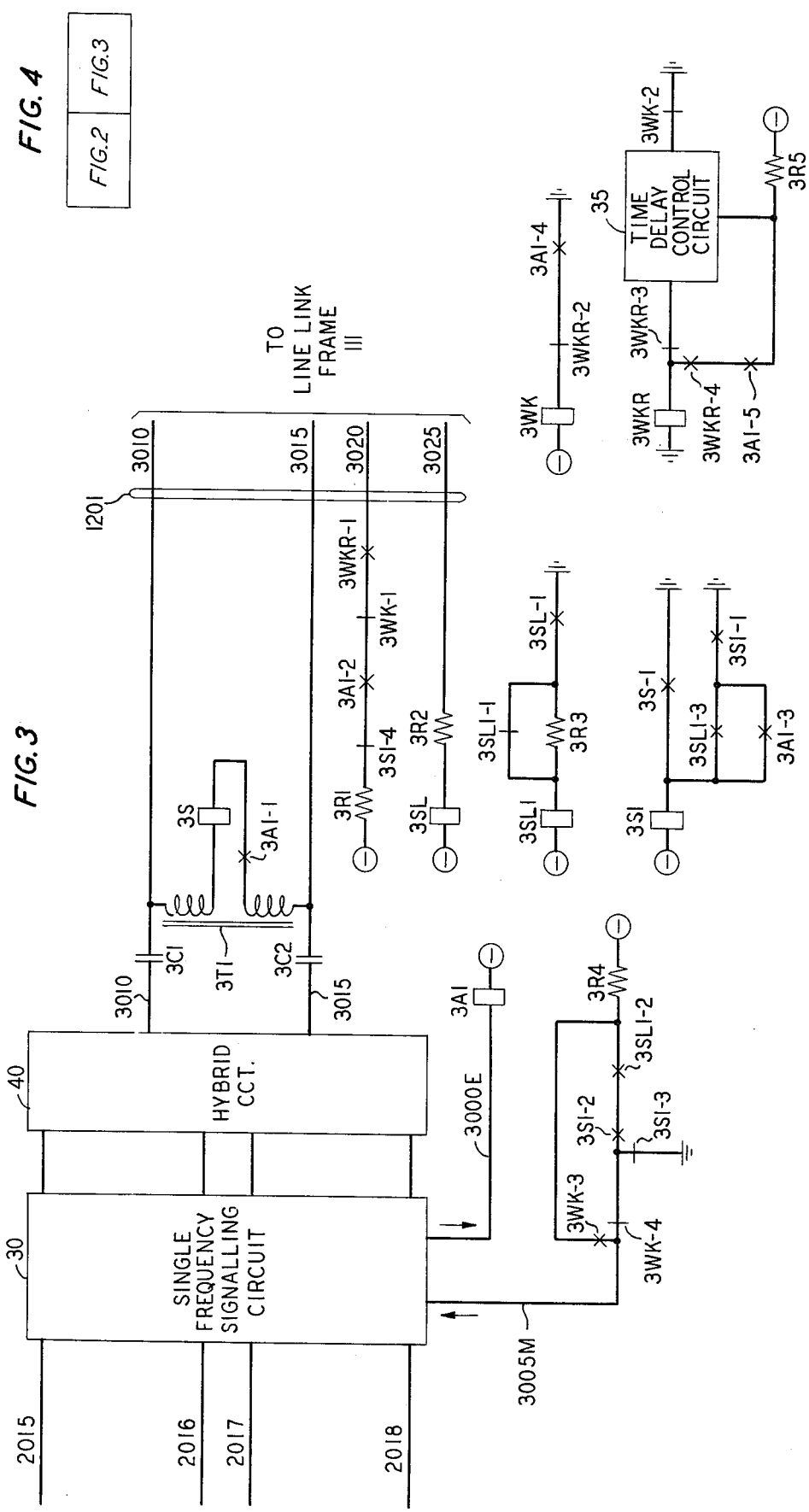

COMMUNICATION FACILITY INTEGRITY CHECKING ARRANGEMENT

BACKGROUND OF THE INVENTION

This invention relates to communication facility checking systems and in particular to an arrangement for checking the integrity of switched communication paths to reduce customer service irregularities due to faulty or inoperative conditions thereon.

In the prior art, telephone calls to directory assistance operators were frequently routed from a fully automatic switching office via a trunk to a destination office equipped with directory assistance operator positions. The establishment of such a connection customarily did not require call address outpulsing. In these arrangements, the common control equipment at the fully automatic office would be released from the connection immediately after the equipment had exchanged cross-office signals with its appropriate outgoing trunk circuit to the destination office. While this signal exchange was effective in verifying the integrity of the cross-office channel at the fully automatic office, the release of the equipment immediately thereafter had the disadvantage of leaving a calling party in the "high-and-dry" condition, i.e., without an audible supervisory response, whenever a carrier outage or other failure had occurred on the interoffice trunk between the outgoing trunk circuit and the operator-assisted office.

Recent trends towards the centralization of directory assistance operators at relatively remote suburban locations, coupled with the more widespread use of the automatic call distribution system for reservation and order taking have caused a proliferation of connections to operator positions. Consequently, the relocation of operator positions onto call distributor switching entities has intensified the need for an integrity check of the entire connection, including the interoffice portion. Thus, early directory assistance switching arrangements have not been equipped to solve "high-and-dry" network performance problems and later developements in the placement of operators have more greatly aggravated the problem.

In certain prior art systems integrity checks are performed on calls requiring outpulsing and the check is incidentally derived during the call setup sequence. This sequence requires that the common control circuit await a "start-outpulsing" signal from the facilities at the destination office. If this signal is not received within a predesignated time interval, timeout circuitry causes the common control circuitry to reattempt the completion of the call over a different outgoing trunk circuit or, if that fails, to connect the calling party to a reorder signal.

The foregoing integrity check is, however, not readily applicable to call processing systems in which no call address outpulsing is made such as when a call is to be completed to an operator position, because, in such systems no "start-outpulsing" signal is used. In order to check the integrity of such a "non-outpulsing" connection, it would be desirable and necessary to delay the release of common control equipment at the fully automatic office until the interoffice integrity check can be completed. The apparent solution of modifying the common control equipment itself by providing for its delayed release and for direct supervision by this equipment of the entire connection including the interoffice position, as is done on calls that do require outpulsing, has two disadvantages. First, the common control equipment changes would have to be extensive so as to be capable of distinguishing among the various subclasses of trunks that are used on "non-outpulsing" calls. For example, the common control unit would have to distinguish between connections to reorder trunks that require no integrity supervision because the trunk employed appears directly at the switch of the fully automatic office and connections to interoffice trunks which, in turn, connect to call distribution destination offices that do require the integrity check. In addition, common control equipment modification would entail the retrofitting of hundreds of common control circuits at all fully automatic offices, thereby entailing great expense.

In view of the foregoing, it is apparent that no facilities were heretofore available for checking the integrity of an interoffice communication path where no outpulsing was utilized in the call processing. A need therefore exists for an arrangement that prevents calling party annoyance and confusion when the switching system does not respond to the caller efforts and does not return an audible call disposition signal because of a trunk outage or a common control equipment failure at the destination office. It is also desirable to provide equipment that verifies interoffice trunk integrity without resorting to costly common control equipment modifications or to changes that affect even those subclasses of "non-outpulsing" call connections which do not require an interoffice integrity check because of their direct termination at the office switch.

SUMMARY OF THE INVENTION

The foregoing and other objects are achieved in accordance with my invention in one specific illustrative embodiment thereof wherein circuitry is incorporated into an outgoing trunk circuit of a toll office and into a line circuit of an ACD (Automatic Call Distribution) directory assistance office for checking the integrity of the communication facility therebetween. This check serves to reduce customer service irregularities arising from a "high-and-dry" fault. The illustrative circuitry includes bistable or binary memory elements which provide a plurality of different supervisory conditions to check for the occurrence of four operation modes or states. These modes sequentially correspond to a selection of the toll outgoing trunk circuit by common control equipment, seizure and activation of supervision at that trunk circuit, receipt of an off-hook seizure acknowledgment signal from the destination office line circuit, and receipt of a subsequent on-hook signal from that line circuit.

To gain an understanding of how the circuit arrangements of my invention may be appropriately integrated into a communication system, a typical prior art connection between a fully automatic office, illustratively a toll crossbar office, and an operator-assisted office, illustratively an automatic call distribution directory assistance office, is reviewed. In establishing a connection between the two offices, a marker is seized at the toll office and an incoming sender is connected thereto. The marker obtains the location of a particular outgoing trunk suitable for use on the call and selects that trunk through a trunk block connector circuit. Thereupon, the marker proceeds to set up the call from the incoming trunk to the selected outgoing trunk by closing appropriate switches in the incoming and outgoing frames of the toll office, thereby establishing a cross-office channel. The marker thereafter releases and causes the sender, through a series of circuit actions, to implement a cross-office continuity check consisting of a signal interchange or "handshake" between itself and the outgoing trunk previously selected by the marker. In particular, the sender, illustratively responsive to marker release, supplies ground over a path that extends therefrom through the switching network and to a supervisory relay in the outgoing trunk circuit.

In such prior art arrangements that suffer from the above-defined problem of premature sender release, the sender supplies ground over a cross-office path that includes the low resistance winding of a sender supervisory relay, the sender link, the incoming trunk, the switches in the incoming and outgoing frames previously operated by the marker, the break contact of a supervisory relay at the outgoing trunk, the winding of that relay and battery. Thus, sender supplied ground very briefly holds the sender supervisory relay and the outgoing trunk supervisory relay operated until the operation of the latter relay opens the cross-office path due to the presence of a supervisory relay break contact in that path. This path opening causes the release of the sender supervisory relay and the subsequent rapid release of the sender from the connection.

Quite independently from these cross-office continuity check circuit actions, the prior art arrangement provides for the transmission of an interoffice seizure signal from the outgoing trunk circuit of the toll crossbar office to the incoming line circuit of the directory assistance crossbar office, often of the ACD type. Accordingly, as soon as the outgoing trunk circuit supervisory relay is operated over the aforementioned cross-office check path, an off-hook seizure signal is sent to the directory assistance office line circuit serving the particular call. The successful receipt of this seizure signal and the subsequent assurance of a continuous interoffice connection is, however, not confirmed, since as previously described, sender release in such calls is effected very rapidly after the operation of the outgoing trunk supervisory relay.

In accordance with the principles of my invention, circuit modifications at the outgoing trunk circuit of the toll office and at the incoming line circuit of the directory assistance office provide for the verification of interoffice trunk integrity prior to sender release. In a preferred embodiment of my invention, the outgoing trunk circuit extending to the line circuit of the ACD office is advantageously equipped with a W-Z relay circuit configuration to establish four operating modes of the trunk circuit prior to sender release. These modes sequentially correspond to marker selection of the outgoing trunk circuit, operation of the supervisory relay at the trunk circuit and transmission of a seizure signal to the ACD line circuit, receipt of an off-hook reply or seizure acknowledgment signal from the ACD line circuit and receipt of a subsequent on-hook signal from that line circuit. Only upon completion of this four-state delay is the sender released from the connection. Further, in my preferred embodiment, the supervisory relay break contact in the cross-office path is eliminated and a configuration of W and Z contacts is substituted therefor. Thus, operation of the trunk circuit supervisory relay does not result in the immediate opening of the cross-office path so that sender release may be deferred until seizure of the ACD line circuit is verified.

A feature of my invention is that circuitry is added to the ACD line circuit which, in response to an interoffice seizure signal generated at the trunk circuit, transmits a timed off-hook wink signal followed by restoration of an on-hook signal condition toward the outgoing trunk circuit. The W and Z contacts that in my preferred illustrative embodiment have replaced the prior art supervisory relay break contact are arranged to open the cross-office continuity check path in response to on-hook signal restoration and to thereby effect rapid sender release in the normal manner.

It will therefore be appreciated that if any interoffice trunk outage or destination office common control equipment failure is encountered, then the cross-office check path will remain closed and the sender supervisory relay will continue to be held by sender-supplied ground over this path. The consequent failure of the sender to release, if prolonged, does not establish a "high-and-dry" condition since sender timeout circuitry is normally activated on connections to operator-assisted offices after sender release, to reroute the call to a reorder trunk or, to reattempt the call if sender release does not occur within the predetermined timeout interval. This normally provided sender timeout circuitry may conveniently be utilized in my preferred illustrative embodiment without sender modifications to take appropriate timeout recovery circuit actions when the sender supervisory relay remains operated for longer than the predetermined interval because the interoffice continuity check between trunk circuit and ACD line circuit is unduly delayed or is unsuccessful.

Thus, in accordance with an aspect of my invention, the integrity of a connection that requires no outpulsing between a fully automatic office and an operator-assisted destination office may be verified without requiring common control equipment modification. Further, the calling customer annoyances and irritations that may arise during the establishment of unverified connections are not encountered.

BRIEF DESCRIPTION OF THE DRAWING

The foregoing and other objects, features and advantages of my invention are more fully understood by a reading of the ensuing descriptions with reference to the drawing in which:

FIG. 3 shows a portion of the line circuit employed at the incoming side of an ACD office; and FIG. 4 depicts the positions in which FIGS. 2 and 3 should be placed to show the cooperation between the toll office trunk circuit and the ACD line circuit.

Figure 2:
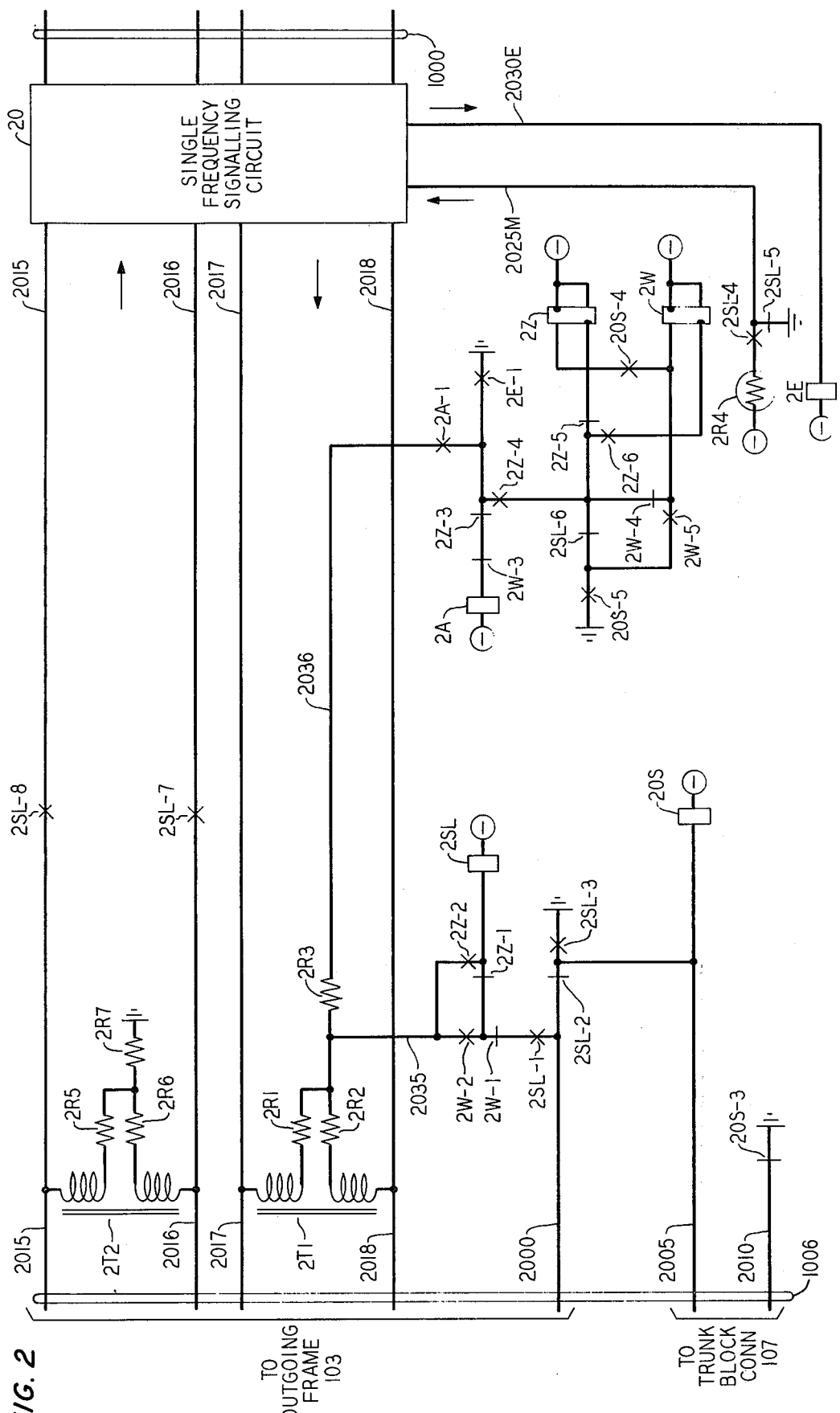
FIG. 2 shows a portion of the outgoing trunk circuit employed at the toll crossbar office.

It is noted that FIGS. 2 and 3 employ the "detached" contact schematic notation in which an "x" crossing the line represents a normally opened contact of a relay, and a bar crossing the line represents a normally closed contact of a relay. This type of notation is described in an article entitled "An Improved Dedicated Contact Type Schematic Circuit Drawing" by F. T. Meyer in the September 1955 issue of the American Institute of Electrical Engineers, *IEEE Transactions Communications and Electronics*, Volume 74, pp. 505–513.

Each relay contact is uniquely designated in the drawing in a manner indicative of the relay of which it is a part. For example, referring to relay make contact 3SL1-1 in FIG. 3, it is noted that the "3" portion of the designation indicates that the winding of the relay appears on FIG. 3, that the "SL1" portion of the designation indicates that it is controlled by relay 3SL1 of FIG. 3 and that the "-1" portion uniquely identifies that particular contact of the 3SL1 relay.

DETAILED DESCRIPTION

Figure 1:
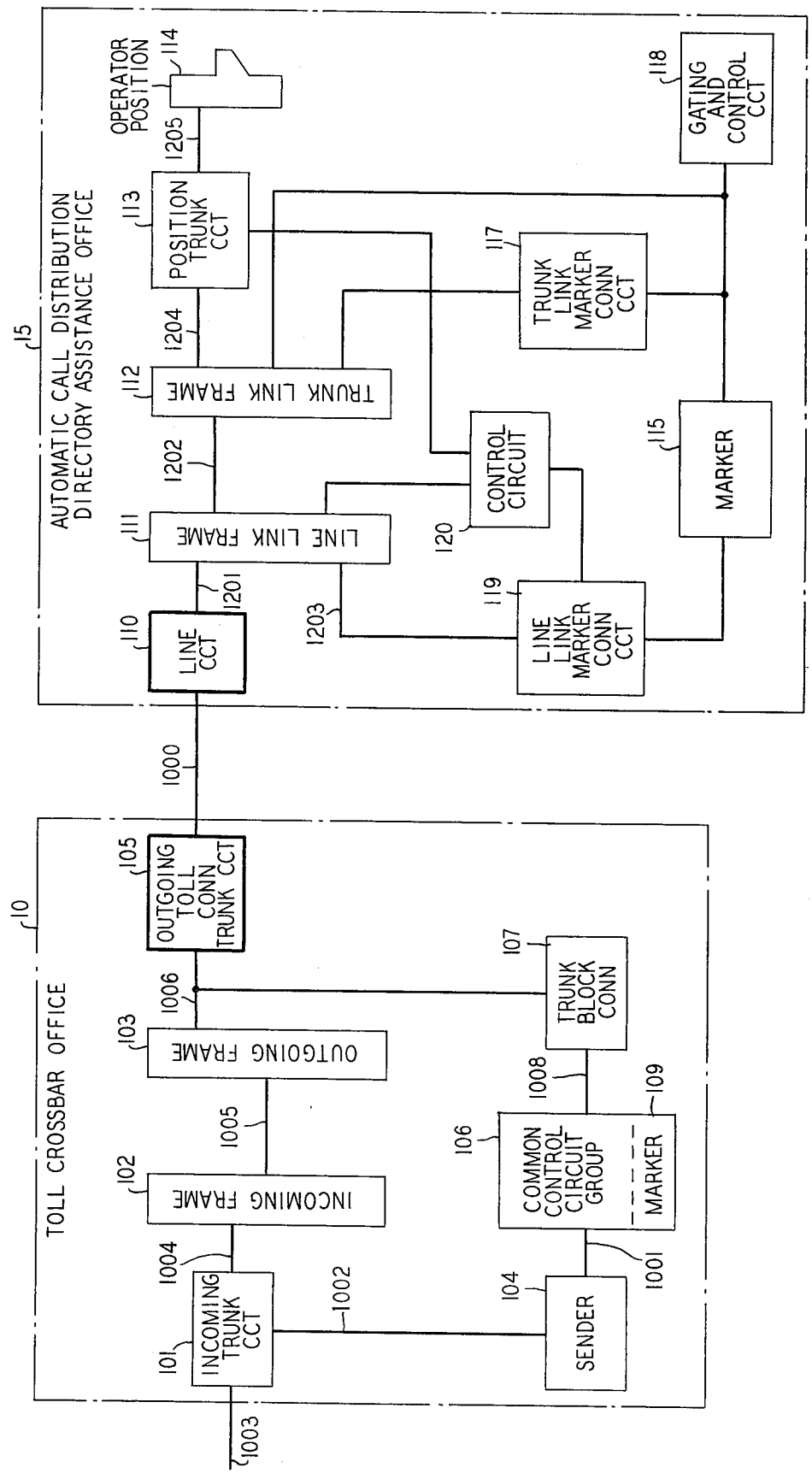
FIG. 1, in block diagram form, depicts a toll crossbar office and an ACD office that connects incoming calls to directory assistance operator positions in accordance with one specific illustrative embodiment of my invention.

Referring to FIG. 1, the equipment employed in the preferred embodiment of my invention is illustratively located at two distinct switching offices. Toll crossbar office 10 is illustratively a crossbar system of the type disclosed in J. W. Gooderham, U.S. Pat. No. 2,868,884, issued May 6, 1952. Automatic call distribution directory assistance office 15 is illustratively a local crossbar office of the type disclosed in T. V. Burns et al., U.S. Pat. No. 3,643,034, issued on Feb. 15, 1972. The equipment units illustrative of the principles of my invention concern the apparatus in outgoing toll connect trunk circuit 105 and in line circuit 110 shown in heavy lines in FIG. 1. The other equipment units are neither shown nor described in detail herein except where necessary for the complete understanding of the invention.

In FIG. 1, a focal point will be the establishment of an interoffice directory assistance call connection over a four-wire trunk 1000 between two terminal circuits trunk circuit 105 and line circuit 110. Such a call arrives in office 10 via an incoming trunk 1003 and incoming trunk circuit 101. The call is then connected to a sender 104 for registering the incoming digit pulses requested for call routing. Following the registration the sender activates common control circuit group 106 which includes marker 109 and other circuits not shown, such as decoders and translators which determine the routing to be used for switching a specific call. Marker 109 then obtains the location of the outgoing trunks suitable for use on the directory assistance call from a decoder circuit (not shown) included in circuit group 106. Guided by this information, the marker selects an outgoing trunk circuit, such a trunk 105 through trunk block connector 107. Thereupon, trunk 105 registers its appearance on outgoing frame 103 at marker 109. Marker 109 then proceeds to set up a cross-office channel between circuit 101 and circuit 105 by testing and activating incoming and junctor links on incoming frame 102 and outgoing and junctor links on outgoing frame 103. A path thus established illustratively extends from trunk circuit 101 over link 1004, selected sets of crosspoints of incoming frame 102, junctor link 1005, selected sets of crosspoints on outgoing frame 103 and link 1006 to circuit 105. When the foregoing is accomplished marker 109 releases from the connection and is available for serving other calls. No address outpulsing is required from office 10 toward the directory assistance office because it is an automatic call distribution system.

Upon release of marker 109, sender 104 completes a cross-office continuity check by extending a ground to hold operated both its supervisory relay (not shown in FIG. 1), through a low resistance winding, and a supervisory relay (not shown in FIG. 1) in trunk circuit 105, over a path that includes link 1002, circuit 101, link 1004, frame 102, link 1005, frame 103, link 1006 and the supervisory relay in trunk circuit 105 to battery. Upon operation of its supervisory relay, trunk circuit 105 sends a seizure signal to line circuit 110.

Since no outpulsing is required for the call, sender 104 in prior arrangements was ready for release as soon as the previously traced cross-office continuity check path was opened due to the presence of a trunk supervisory relay break contact in that path. As a result, sender 104 did not await confirmation of line circuit seizure before it released. In accordance with the principles of my invention and as will be described, circuitry is provided in trunk circuit 105 and line circuit 110 to confirm that seizure is effected. Upon seizure of line circuit 110, a request is generated for connection to an operator position, which request is served approximately in the order in which it is received. Control circuit 120 controls frame gates on all line link frames by interrogating such frames or requests during a prescribed interval. These service requests are presented to queue gates (not shown) in the line link frames, which gates are provided to ensure that later-arriving requests do not receive service ahead of earlier call arrivals. Control circuit 120 also monitors the busy-idle condition of operator position trunks.

If a position is available, the request is admitted into the queue gate associated with line link frame 111 which in turn presents a bidding signal to line link marker connector circuit 119. The latter responds, by connecting itself to marker 115 which then proceeds to connect calling line circuit 110 to a desired operator position 114 by selecting, via trunk link marker connector circuit 117, a preferred position link 1204 and its associated position trunk circuit 113 which terminates over link 1205 at operator position 114. If in attempting to do so, marker 115 finds no preferred position trunks, it causes the operation of gating and control circuit 118 to permit non-preferred positioned trunks associated with idle operator positions to become preferred. This newly preferred trunk and associated operator position is then selected by the marker. Thereafter, marker 115 selects an available channel that illustratively extends over line circuit 110, link 1201, line link frame 111, junctor link 1202, trunk link frame 112, link 1204, position trunk circuit 113 and link 1205 to operator position 114. After the appropriate switches are closed in line link frame 111 and trunk link frame 112, a connection is completed.

In accordance with the illustrative embodiment of my invention, circuit modifications and additions are made to trunk circuit 105 and line circuit 110 of the Gooderham and Burns systems so that seizure of line circuit 110 and subsequent call set-up circuit operations at ACD office 15 are coordinated with the aforementioned cross-office continuity check between sender 104 and trunk circuit 105. Turning now to FIG. 2, the four-wire toll connect trunk circuit 105 is schematically shown. It is essentially a modified version of the trunk circuit depicted in FIG. 45 of the Gooderham patent and described in patent column 140. Specifically, tip and ring transmit leads 4502, 4503, 4507 and 4506 of the Gooderham patent, functionally correspond to leads 2015 and 2016 of FIG. 2. Similarly, tip and ring receive leads 4504 and 4505 of the Gooderham patent functionally correspond to tip and ring leads 2017 and 2018 of FIG. 2. It will be appreciated, however, that the method of signaling employed between the trunk circuit of FIG. 2 and the line circuit of FIG. 3 is of the E and M type wherein alternating current single frequency signaling is employed as described in the article "Signaling Systems for Control of Telephone Switching" by C. Breen and C. A. Dahlbom in the *Bell System Technical Journal*, Volume 39, No. 6, November 1960, pages 1381–1444. The E and M signaling system is employed in the four-wire trunk circuit depicted IN FIG. 2 in contradistinction to the loop signaling arrangement depicted in the four-wire trunk ciruit of FIG. 45 of the Gooderham patent. It will be appreciated that the actual mode of signaling is not critical to the operation of my novel arrangement and is presented in the E and M mode of signaling to facilitate description. In addition, because of the previously mentioned trend of placing directory assistance operation positions at remote locations, alternating current, E and M signaling is more likely to be employed over the resultant longer transmission paths than is loop signaling which is more suitable for short-haul trunks.

Further comparison of the trunk circuit depicted in FIG. 45 of the Gooderham patent and the trunk circuit portion shown herein in FIG. 2 indicates that lead 2005 functionally corresponds to lead 4500 in FIG. 45 of the Gooderham patent with the modification that a seizure recognizing relay 20S has been added in my FIG. 2 in place of the battery and resistor connected to lead 4500 of the Gooderham trunk circuit. In addition, there is a functional correspondence between lead 4501 and lead 2000 of my FIG. 2 and between lead 4508 of the Gooderham trunk circuit and lead 2010 in FIG. 2. The functions of these leads will become apparent in the ensuing description of the preferred embodiment.

As priorly explained trunk circuit 105 initially becomes involved in a directory assistance call when a marker tests for the trunk busy-idle status. This test is made by examining lead 2005 of FIG. 2 for a busy ground. If the trunk circuit is in use, relay 2SL of FIG. 2 is operated as will be described hereinafter and ground is supplied on lead 2005 by a make contact 2SL-3. In the absence of such ground, the trunk circuit tests idle and the marker, via trunk block connector 107, then supplies ground to lead 2005 of link 1006 for operating seizure indicating relay 20S. At the same time, ground which had been formerly supplied over contact 20S-3 is removed from lead 2010. This ground, when present, is supplied via trunk block connector 107 to the group-busy relays included in common control circuit group 106 to give a group-busy indication to the decoder circuit of circuit group 106. Operation of the 20S relay removes this ground and makes it possible for a group-busy indication to be made.

After marker 109 selects a cross-office channel and closes the appropriate crosspoint switches at incoming frames 102 and 103 in FIG. 1, ground is extended from outgoing frame 103 to lead 2000 of link 1006. This ground, via break contact 2SL-2, serves to hold relay 20S operated and to provide ground over lead 2005 to marker 109 via trunk block connector 107 to indicate the busy status of the circuit.

It is a novel aspect of my invention that a W-Z relay arrangement and associated contact configuration is provided at the outgoing trunk circuit to achieve among other things, an inhibiting or delay of sender release until an interoffice continuity check is successfully completed.

Initially before the marker has seized the trunk circuit and has so indicated by operating relay 20S, it will be seen that both differential relays 2W and 2Z remain unoperated. In the case of relay 2W, battery is supplied through the upper winding thereof over contacts 2W-4 and 2SL-6, but the path is not completed because relay 20S has not yet been operated so that the path cannot be closed to ground over open make contact 20S-5. Similarly, battery supplied over the lower winding of relay 2W does not close a path to ground because relay 2Z, which will be shown to be unoperated, opens a possible path to ground by maintaining the non-closure of its associated contact 2Z-6. Turning to relay 2Z, it will be seen that no paths to ground may be completed by either the upper or lower winding of the relay because relay 20S remains unoperated and opens any possible path to ground at make contacts 20S-4 and 20S-5.

After seizure of the trunk circuit occurs, relay 20S is operated in the manner heretofore described, thereby causing relay 2W to operate and relay 2Z to remain unoperated. Relay 2W operates over a path from battery through its upper winding over contacts 2W-4, 2SL-6 and 20S-5 to ground. No path extending from battery through the lower winding of 2W can be completed to ground because relay 2Z continues to remain unoperated, as will be demonstrated hereinafter, and in its unoperated state opens the path at make contact 2Z-6. Relay 2Z remains unoperated because circuits are completed through each of the windings of the relay. Specifically, battery is supplied through the upper winding of relay 2Z and over contacts 20S-4, 2W-4, 2SL-6 and 20S-5 to ground. After relay 2W operates, the path through the upper winding of relay 2Z extends through contacts 20S-4, 2W-5 and 20S-5 to ground. The circuit completed through the lower winding of relay 2Z extends from battery, through the lower winding of relay 2Z and over contacts 2Z-5, 2SL-6 and 20S-5 to ground.

In accordance with sender functions as described in the Gooderham patent at columns 87 and 145, release of marker 109 from the connection causes ground to be supplied over the low resistance winding of a sender supervisory relay, the tip and ring receive leads, the incoming trunk circuit, the incoming frame, the outgoing frame and to the outgoing trunk circuit. In accordance with the principles of my invention, this ground appears on tip and ring receive leads 2017 and 2018 of FIG. 2 where ground is presented at transformer 2T1 over resistors 2R1 and 2R2 and is simplexed onto lead 2035 and electrically coupled over contacts 2W-2 and 2Z-1 to operate relay 2SL. Transmit tip and ring leads 2015 and 2016 are cut through at this time in preparation for conversation due to the closure of contacts 2SL-7 and 2SL-8.

Operation of relay 2SL causes relay 2W to remain operated and also serves to operate relay 2Z. Relay 2W may be seen to be operated because battery is supplied over its upper winding through contacts 2W-5 and 20S-5 to ground; but no path may be completed from battery through the lower winding of relay 2W because such potential path, while extending over contact 2Z-6, may not be completed to ground because of the opening of the path at break contact 2SL-6. Relay 2Z does however operate because battery is supplied through its upper winding over contacts 20S-4, 2W-5 and 20S-5; but battery supplied to the lower winding of 2Z may not complete a path to ground because of the opening of the path at contact 2SL-6. The operation of relay 2Z supplies a holding ground for relay 2SL over simplex lead 2035 and via contact 2Z-2.

In accordance with the normally adopted convention for E and M signaling as shown at page 1409, FIG. 4 of the Breen et al. *Bell System Technical Journal* article, an on-hook signal is conveyed on the transmit or M lead by presenting ground thereover while an off-hook is conveyed by presenting battery. On the other hand, off-hook from the distant-end single frequency signaling circuit is conveyed when ground is received over the receive or E lead to operate an indicator relay. On-hook is conveyed from the distant end when an open circuit is received on the E lead whereupon the indicator relay remains unoperated. In my illustrative embodiment, the transmit and receive leads of the trunk circuit in FIG. 2 are labelled 2025M and 2030E respectively and relay 2E is the indicator relay. In the line circuit in FIG. 3 the transmit and receive leads are leads 3000E and 3005M respectively and relay 3A1 is the indicator relay.

Thus, prior to the operation of relay 2SL, on-hook ground had been presented via contact 2SL-5 over transmit lead 2025M and was conveyed over single frequency signaling circuit 20, the operation and circuitry of which is described in the Breen et al. *Bell System Technical Journal* article at pages 1418 through 1422 and is schematically depicted in FIG. 17 thereof. A similar single frequency signaling circuit 30 at the destination office recognizes this on-hook signal and in accordance with the previously described convention causes an open condition on receive lead 3000E (FIG. 3) so that relay 3A1 remains unoperated.

In accordance with the principles of my invention, the operation of relay 2SL does not cause the immediate release of the sender supervisory relay (not shown) and delays such release until a successful continuity check across the interoffice trunk 1000 has been successfully completed as will be described hereinafter. Thus, operation of relay 2SL causes off-hook battery to be conveyed over lamp resistance 2R4 and contact 2SL-4 onto lead 2025M. This battery is recognized as a seizure signal at single frequency circuit 30 in the automatic call distribution office 15 to provide off-hook ground on receive lead 3000E to operate relay 3A1, thereby indicating seizure of the line circuit.

Operation of line circuit 110 proceeds substantially as described in the Burns et al. patent and as depicted in FIGS. 4 and 5 thereof except that E and M signaling is employed in my illustrative embodiment for the reasons previously mentioned instead of the reverse battery arrangement depicted in FIG. 4 of the Burns et al. patent.

In accordance with a novel aspect of my invention, a timed off-hook "wink" is transmitted from the line circuit back to the toll office outgoing trunk circuit to acknowledge line circuit seizure. Timing of this off-hook signal is achieved by providing relay 3WK and 3WKR, their associated relay contacts, and time delay control circuit 35. The operation of delay circuit 35 is described in M. E. Krom, U.S. Pat. No. 3,239,690, issued on Mar. 8, 1966. In accordance with that description, the operation of indicator relay 3WKR occurs after a timed interval has elapsed since ground has been removed by the opening of a path to ground at break contact 3WK-2.

Relay 3WKR is initially unoperated. Receipt of the off-hook seizure signal that has resulted in the operation of relay 3A1, causes relay 3WK to operate over a path that extends from ground, over contacts 3A1-4 and 3WKR-2, through the winding of relay 3WK and to battery. The operation of relay 3WK causes the removal of the ground at contact 3WK-2 from delay circuit 35. As described in the Krom patent, the removal of this ground acts as the switch which triggers the operation of delay circuit 35 and initiates the duration of a suitable timing interval, illustratively chosen to be in the range of 150 to 230 milliseconds. At the end of this timing interval, relay 3WKR is operated by a path traceable from battery through resistor 3R5, through delay circuit 35, contact 3WKR-3, through the winding of relay 3WKR to ground. Relay 3WKR is then held operated for the duration of the call by a path that extends from battery through resistor 3R5 over contacts 3A1-5 and 3WKR-4 and the winding of relay 3WKR to ground.

Relay 3WK operated, also causes an off-hook battery signal to be presented over resistor 3R4 and make contact 3WK-3 onto transmit lead 3005M. After the repeating of this off-hook signal to single frequency circuit 30, over trunk 1000 and single frequency circuit 20, off-hook ground is presented on receive lead 2030E to operate relay 2E at the trunk circuit.

It will be recalled that at this point in the operation of the trunk circuit, after relay 2SL had operated, both relays 2W and 2Z were operated. Subsequent operation of relay 2E, which signals the receipt of the off-hook wink for the duration of the timing interval established by delay circuit 35, causes the release of relay 2W but continues to hold relay 2Z operated. Initially, while relay 2W is still operated, battery is supplied to the upper winding of relay 2W over a path that includes contacts 2W-5 and 20S-5 to ground. When relay 2E operates, a complete circuit may also be traced through the lower winding of relay 2W over a path that includes contacts 2Z-6, 2Z-4 and 2E-1 to ground. Differential relay 2W, having closed circuits through each of its windings, therefore releases. The circuit through the upper winding of relay 2W then remains closed over a path that includes contacts 2W-4, 2Z-4 and 2E-1 to ground. With respect to relay 2Z, no path is completed through its lower winding because of the presence of an open circuit at contact 2Z-5. A closed circuit is maintained through the upper winding of relay 2Z over a path that includes contacts 20S-4, 2W-5 and 20S-5 to ground while relay 2W is still operated and which includes contacts 20S-4, 2W-4, 2Z-4 and 2E-1 to ground after relay 2W has released.

When the timing interval established by delay circuit 35 has elapsed, relay 3WKR operates and is so held throughout the remainder of the directory assistance call in the manner previously described. Relay 3WK, because of the opening of contact 3WKR-2, then releases. Operation of relay 3WKR causes a service request signal in the form of battery to be presented over resistor 3R1 and contacts 3S1-4, 3A1-2, 3WK-1 and 3WKR-1 onto lead 3020 to line link frame 111. This service request is acted upon at line link frame 111 and at associated common control circuitry of ACD 15 in the manner described in the Burns et al. patent. As described therein, the line link frame supplies a ground during the establishment of the cross-office connection to the selected operation position. This ground in my preferred embodiment is extended to lead 3025, resistor 3R2, the winding of relay 3SL to battery, thereby operating relay 3SL. Relay 3SL in turn operates auxiliary relay 3SL1 by providing ground through contacts 3SL-1 and 3SL1-1. Relay 3SL1 operated, opens contact 3SL1-1 and is held operated by the path which extends through resistor 3R3, thereby reducing its steady-state current drain for the duration of the call. Line circuit 110, at this point, awaits a supervisory signal generated at the responding operator position, which signal will be acted upon in the manner to be described below.

To complete the interoffice continuity check, off-hook battery, formerly supplied to lead 3005M, is now removed due to the opening of contact 3WK-3. Thus, on-hook ground is supplied over contacts 3S1-3 and 3WK-4 to lead 3005M which in accordance with signaling convention is recognized over lead 2030E of the trunk circuit as an open circuit signal, thereby releasing relay 2E. Release of relay 2E signifies the completion of the off-hook wink and the successful completion of the interoffice integrity check. Release of relay 2E maintains relay 2W in the unoperated state and releases relay 2Z. Relay 2W, previously unoperated, is so maintained because no path to ground can be completed through either of its windings. In particular, battery supplied through the upper winding of relay 2W and passing through contacts 2W-4 and 2Z-4 encounters an open circuit at open contact 2E-1. Battery supplied through the lower winding of relay 2W and over contacts 2Z-6 and 2Z-4 similarly encounters an open circuit. Relay 2Z is released because battery supplied through its upper windings through contacts 20S-4, 2W-4 and 2Z-4 encounters an open circuit at contact 2E-1. Battery supplied to the lower winding of relay 2Z, while that relay is still operated, encounters an open circuit at contact 2Z-5. Upon release of relay 2Z, no possible complete circuit path exists through either the upper or lower winding of relays 2W or 2Z.

It will be noted that relays 2W and 2Z are now, at the conclusion of the interoffice integrity check, in the same configuration as they were before the trunk was seized, i.e., both are unoperated. Thus, relay 2SL is now held for the duration of the call by ground supplied from outgoing frame 103 over lead 2000 through contacts 2SL-1, 2W-1 and 2Z-1. At the same time, the cross-office continuity check path, which included sender supplied ground through the low resistance winding of the sender supervisory relay (not shown) across the toll office switching network, onto tip and ring receive leads 2017 and 2018 and onto simplex lead 2035 to hold relay 2SL, is now open. The opening of this path causes the sender supervisory relay to release and triggers a series of well-known circuit actions that culminates in sender release as described in the Gooderham patent. Thus, it is noted that the completion of the cross-office check and consequent sender release has been delayed until the interoffice continuity check is successfully completed.

Assuming that the integrity of the entire connection from incoming trunk circuit 101 to operator position 114 has been successfully tested, supervisory signals dependent on the actions of calling party and the operator may be freely exchanged. Thus, referring to FIG. 3, upon the occurrence of operator answer, supervisory relay 3S is operated when battery and ground are supplied over leads 3010 and 3015, respectively, through the coils of transformer 3T1 in series with contact 3A1-1. Operation of relay 3S in turn operates relay 3S1 over a path extending from ground, through contact 3S-1 and through the winding of relay 3S1 to battery. Relay 3S1 is then held by ground supplied through contact 3S1-1 and contacts 3SL1-3 and 3A1-3 in parallel therewith. Operation of relay 3S1 sends an off-hook supervisory signal by presenting battery over a path, including resistor 3R4 and contacts 3SL1-2, 3S1-2 and 3WK-4 to transmit lead 3005M.

This operator answer supervisory signal appears as an off-hook ground at receive lead 2030E to operate relay 2E. Operation of relay 2E, in turn, operates relay 2A over a path that extends from ground and through contacts 2E-1, 2Z-3, 2W-3 and through the winding of relay 2A to battery. Relay 2A operated, allows a ground supplied through contacts 2E-1 and 2A-1 to appear on lead 2036 and to be transmitted via resistors 2R3, 2R1 and 2R2, transformer 2T1, and across the toll crossbar office switching network to incoming trunk circuit 101. Thereupon it may be acted upon in the conventional manner as described in the Gooderham patent. Conversation may thereafter be conducted over a path that includes tip and ring leads 3010 and 3015, four wire-to-two wire hybrid circuit 40 and signaling circuit 30, trunk 1000, signaling circuit 20 and leads 2015-2018. If the operator disconnects, relays 3S, 3SL and 3SL1 are successively released, thereby causing the removal at contact 3SL1-2 of off-hook battery at lead 3005M. This battery removal, when recognized at the trunk circuit as an open circuit, on-hook signal, releases relay 2E and removes ground at contact 2E-1 from lead 2036 which had formerly been supplied to the trunk circuit.

If the interoffice continuity check is not successfully completed due to an outage on trunk 1000 or to a malfunction in the switching equipment or line circuit of ACD office 15, the cross-office continuity check path extending from sender supplied ground to relay 2SL in the trunk circuit is maintained as a closed circuit. Thus, the sender supervisory relay (not shown) continues to remain operated and if so maintained will cause timeout circuitry in the sender to be activated as described in the Gooderham patent at columns 147 through 151. Activation of the timeout circuitry will result in the adoption of standard timeout procedures such as the call being reattempted or being routed to a reorder trunk. Thus, unless the completion of the off-hook wink is successfully detected at the trunk circuit as signified by the release of relay 2E, the configuration of relays 2W and 2Z will not allow the opening of the cross-office continuity check path to occur. It will be noted that no sender modification is required to respond to an interoffice continuity check failure since previously designed timeout circuitry is employed for this purpose.

Thus, I have shown an illustrative embodiment of my invention in which the integrity of an interoffice communication channel between a fully automatic and an operated-assisted office is checked even when no outpulsing is employed thereacross. Moreover, I have enabled this check to be implemented by adding binary memory elements and associated circuitry to the trunk circuit and by providing circuitry for the generation of a "wink" signal in the line circuit of the destination office without necessitating modification of common control equipment.

It will be apparent to those of ordinary skill in the art that numerous modifications of the illustrative embodiment herein described may be made without departing from the spirit or scope of the invention. Thus, for example, the mode of signaling need not be restricted to inband, single frequency E and M signaling, but could be extended to other signaling systems such as loop signaling or derived signaling as described in the Breen et al. *Bell System Technical Journal* article. All such signaling systems may employ my arrangement by providing an indicator relay, 2E, capable of recognizing on-hooks or off-hooks transmitted from the distant end local office so that the binary memory elements, illustratively a W-Z relay circuit, may sequentially proceed through the previously described four operating modes. In addition, it will be appreciated that the type of office serving line circuit 110 need not be restricted to directory assistance functions and need not be an automatic call distribution office. Furthermore, the interoffice integrity check arrangement of my invention may be implemented on a connection between any two switching offices including those that utilize address outpulsing during call establishment. However, as described earlier, such connections may have alternative means for checking interoffice integrity, because calls utilizing outpulsing may incidentally derive a continuity check while awaiting a "start-outpulsing" signal. It will also be noted that trunk 1000 need not extend between two geographically distinct offices, but may represent a trunk link that establishes a "non-outpulsing" type of connection between two circuits, each separately controlled by a different group of switches and common control circuits. Further and other modifications of the embodiment will be apparent to those of ordinary skill in the art.

What is claimed is:

1. An arrangement for verifying the integrity of an interoffice communication channel connecting a first terminal to a second terminal comprising:
   means in said first terminal actuated by a receipt of a first check signal from a checking circuit selectively connected thereto for sending a first integrity verification signal over said interoffice channel to said second terminal,
   means in said second terminal actuated in response to a receipt of said first verification signal from said first terminal for transmitting thereto a second verification signal of predetermined duration to complete said interoffice integrity verification, and
   means actuated by a receipt of said second verification signal and deactuated upon the expiration of said predetermined duration for delaying the transmission of a second check signal to said checking circuit until said interoffice integrity verification has been completed to thereafter effect the disconnection of said checking circuit.

2. The arrangement in accordance with claim 1 further comprising:
   supervisory relay means included in said first terminal and actuated by said receipt of said first check signal for indicating the receipt thereof from said checking circuit to actuate said sending means, and
   a pair of differential relays included in said delaying means for controlling the operation of said supervisory relay means and for effecting said disconnection of said checking circuit after the said predetermined duration.

3. The arrangement in accordance with claim 2 wherein said second terminal further includes;
   means included in said transmitting means actuated upon the receipt of said first verification signal for applying a signal of given polarity to said interoffice connection to effect a transmission of said second verification signal for said predetermined duration,
   timing means operated upon the receipt of said first verification signal and released upon the expiration of said predetermined duration for generating a time interval having said predetermined duration, and
   means included in said transmitting means operated in response to the release of said timing means after said expiration of said predetermined duration for reversing the polarity of said signal of given polarity to complete said transmission of said second verification signal and thereafter to effect said disconnection of said checking circuit.

4. In a telephone switching system wherein common control equipment is seized at a first switching office to establish a call over an interoffice connection to a second switching office and is released subsequent to an interchange of signals along a cross-office path between said equipment and the outgoing trunk at said first office selected to serve said call,
   an arrangement for verifying the integrity of said interoffice connection comprising
   means included in said outgoing trunk operated in response to the receipt of a first one of said interchange signals from said equipment for thereupon transmitting a seizure signal over said interoffice trunk to said second office,
   means in said second office responsive to the receipt of said seizure signal for sending a seizure acknowledgement signal of designated polarity to said outgoing trunk,
   means in said second office operated after a preselected timeout interval for reversing said designated polarity, and
   means in said outgoing trunk operated only in response to the receipt of said seizure acknowledgment signal of reverse polarity for returning a second one of said interchange signals to effect a release of said equipment.

5. The arrangement in accordance with claim 4 wherein said outgoing trunk further includes:
   multistate circuit means effective to establish a plurality of operating states of said trunk circuit for inhibiting said returning means from effecting a release of said equipment until said receipt of said reverse polarity acknowledgment signal,
   said multistate circuit means establishing
   a first state in response to a selection of said trunk by said equipment for detecting a receipt of said first interchange signal,
   a second state in response to said receipt of said first interchange signal for operating said transmitting means to send said seizure signal to said second office,
   a third state in response to the detection of said seizure acknowledgment signal of designated polarity for indicating a receipt thereof, and
   a fourth state in response to the detection of said seizure acknowledgment signal of reverse polarity for operating said returning means to effect said release of said equipment.

6. The arrangement in accordance with claim 5 wherein said multistate circuit means comprises:
   a plurality of bistable memory elements to establish said plurality of operating states of said trunk circuit.

7. The arrangement in accordance with claim 6 wherein said bistable elements comprise a pair of differential relays and wherein said outgoing trunk circuit further comprises:
   a busy relay operated in response to said selection of said trunk circuit for the service of said call,
   first contact means actuated by the operation of said busy relay for operating a first one of said pair of relays and for maintaining released a second one of said pair of relays to establish said first state,
   a trunk supervisory relay operated during said first state in response to said receipt of said first interchange signal,
   second contact means actuated by the operation of said supervisory relay for maintaining operated said first of said pair of relays and for operating said second of said pair of relays to establish said second state, and third contact means included in said transmitting means and responsive to the operation of said trunk supervisory relay for applying said seizure signal over said interoffice connection to said second office.

8. The arrangement in accordance with claim 7 wherein said outgoing trunk circuit further comprises:

a signaling relay operated during said second state upon detection of said seizure acknowledgment signal of designated polarity for indicating the receipt thereof and released during said third state upon said receipt of said seizure acknowledgment signal of reverse polarity, fourth contact means actuated by the operation of said signaling relay for releasing said first of said pair of relays and for maintaining operated said second of said pair of relays to establish said third state, and fifth contact means actuated by the release of said signaling relay for maintaining released said first of said pair of relays and for releasing said second of said pair of relays to establish said fourth state.

9. The arrangement in accordance with claim 8 wherein said returning means comprises:

sixth contact means actuated only when said multistate circuit is in said first state for electrically coupling said trunk supervisory relay to said cross-office path to operate said trunk supervisory relay when said first interchange signal is received from said equipment, and seventh contact means actuated only when said multistate circuit is in said second and said third states for further electrically coupling said trunk supervisory relay to said cross-office path and deactuated when said multistate circuit is in said fourth state for electrically decoupling said trunk supervisory relay from said cross-office path to provide said second interchange signal.

10. The arrangement in accordance with claim 9 wherein said sending and said returning means are included in a line circuit in said second office, said line circuit further including:

a line supervisory relay operated in response to the receipt of said seizure signal, a control relay included in said reversing means operated in response to the operation of said line supervisory relay and released in response to the expiration of said timeout interval, eighth contact means actuated by the operation of said control relay for connecting said sending means to said interoffice connection and deactuated upon the release of said control relay, a time delay control circuit triggerable to generate said preselected timeout interval and deactivated upon the expiration thereof, ninth contact means controlled by said control relay for triggering said time delay control circuit, an indicator relay operated upon the expiration of said timeout interval to deactivate said time delay control circuit and to release said control relay, and tenth contact means actuated by the release of said control relay for connecting said reverse polarity signal to said interoffice connection.

11. The invention in accordance with claim 10 wherein E and M supervisory signaling is employed between said first and said second offices and wherein said seizure and said designated polarity signals have off-hook polarity and said reverse polarity signal has on-hook polarity, the arrangement further comprising:

first signal circuit means in said trunk circuit connecting said cross-office path to said interoffice connection for operating said signaling relay upon detection of said off-hook designated polarity and for releasing said signaling relay upon detection of said on-hook reverse polarity, and second signaling circuit means in said line circuit for operating said line supervisory relay upon detection of said off-hook seizure signal.

12. The arrangement in accordance with claim 4 wherein said reversing means comprises:

bistate means actuated by said seizure signal for initiating the duration of said preselected timeout interval and deactuated upon the expiration thereof for terminating said designated polarity signal to send said signal of reverse polarity.

13. The arrangement in accordance with claim 12 wherein said sending means and said reversing means are included in a line circuit at said second office, said line circuit further including:

a line supervisory relay operated in response to said seizure signal to actuate said bistate means, and timing means operated upon the actuation of said bistate initiating means for generating said preselected timeout interval.

14. The arrangement in accordance with claim 13 wherein said timing means further includes:

relay means operated after said preselected timeout interval for indicating the expiration thereof to deactuate said bistate means and thereafter to send said signal of reverse polarity.

15. An arrangement for verifying the integrity of a communication facility comprising:

a plurality of terminal circuits, a switching network, common control means for establishing a channel across said switching network between a first and second one of said terminal circuits, said communication facility directly connecting said second terminal circuit with a third one of said terminal circuits, continuity checking means connected to said channel for thereacross exchanging check signals on a timeout basis with said second terminal circuit to test the continuity of said channel and released from said channel upon completion of said exchange of check signals, means in said second terminal circuit actuated by the receipt of a first one of said check signals from said continuity checking means for sending a seizure signal to said third terminal circuit over said facility, means in said third terminal circuit responsive to the receipt of said seizure signal for returning an acknowledgement signal of prescribed duration to said second terminal circuit, and means at said second terminal circuit actuated in response to said common control means controlling an establishment of said channel for inhibiting a sending of a second one of said check signals to said continuity checking means until after said acknowledgment signal has been received for said prescribed duration to allow said release of said common control means when said continuity is verified and to prevent said channel from remaining unnecessarily established upon the occurrence of a continuity check failure.

16. The arrangement in accordance with claim 15 wherein said acknowledgment signal comprises a first reply signal of given polarity and a second reply signal of opposite polarity and wherein said means at said third terminal circuit comprises:
   means for transmitting said first reply signal to said second terminal circuit,
   a timing circuit triggered upon the receipt of said seizure signal and released after the expiration of said prescribed duration, and
   means responsive to said release of said timing circuit for terminating said first reply signal and for transmitting said second reply signal to said second terminal circuit.

17. The arrangement in accordance with claim 16 wherein said second terminal circuit includes:
   a plurality of binary memory elements, and
   circuit means interconnecting said memory elements for establishing a plurality of operating modes of said second terminal circuit to actuate said sending means and to deactuate said inhibiting means.

18. The arrangement in accordance with claim 17 wherein each of said memory elements is a differential relay and wherein said means for inhibiting includes:
   first relay contact means connected to said channel when said circuit means is in a first one of said operating modes for maintaining said first check signal from said checking means until said sending of said second check signal, and
   supervisory relay means connected to said first contact means and responsive to the receipt thereover of said first check signal for operating said circuit means to a second one of said modes indicating a receipt of said seizure signal.

19. The invention in accordance with claim 18 wherein said second check signal is generated by the disconnection of said supervisory relay from said channel, the arrangement further comprising:
   second relay contact means in said inhibiting means connected between said channel and said supervisory relay means and bridging said first contact means actuated when said circuit means is in said second operating mode for further maintaining an application of said first check signal to said supervisory relay means, and
   signal detecting means operated upon the receipt of said first reply signal for indicating the receipt thereof to place said circuit means in a third operating mode and released upon the receipt of said second reply signal of reverse polarity for specifying the receipt thereof to place said circuit means in a fourth operating mode and to then disconnect said supervisory relay from said channel.

20. An arrangement for verifying the integrity of a communication facility between a trunk circuit in a first switching office and a line circuit in a second switching office and comprising:
   a W-Z relay circuit in the trunk circuit of the first office wherein both said W and said Z relays are differentially wound relays,
   means for placing said W-Z relay circuit in a first state on selection of the outgoing trunk circuit in the first office,
   means for placing said W-Z relay circuit in a second state on seizure and activation of supervision of said trunk circuit in said first office,
   means for placing said W-Ż relay circuit in a third state on receipt of an off-hook seizure acknowledgment signal from said line circuit of the second office, and
   means for returning said W-Z relay circuit to its initial state on receipt of a subsequent on-hook signal of predetermined duration from said line circuit of the second office.

21. An arrangement for delaying the release of a sender in a toll office until verification of seizure of a line circuit in a distant office to check the integrity of the interoffice communication facility comprising
   a memory circuit at the toll office having four states,
   means for placing said memory circuit in a first state upon selection of an outgoing trunk circuit at the toll office,
   means for placing said memory circuit in a second state on transmission of a seizure signal over the trunk circuit to the distant office,
   means responsive to a seizure acknowledgment signal having a prescribed duration from the line circuit of the distant office for placing said memory circuit in a third state,
   means responsive to receipt of an on-hook signal from the line circuit of the distant office after said prescribed duration for returning said memory circuit to its initial state, and
   means responsive to the return of said memory circuit to its initial state for opening a cross-office path in said toll office to effect release of the sender therefrom.

* * * * *